(12) United States Patent
Hogstead (10) Patent No.: US 11,851,990 B2
(45) Date of Patent: Dec. 26, 2023

(54) SYSTEM AND PROCESS FOR INSTALLING A HYDROCARBON PRODUCTION SYSTEM (71) Applicant: Cenovus Energy Inc., Calgary (CA)

(72) Inventor: Clifford Vernon Hogstead, Calgary (CA)

(73) Assignee: Cenovus Energy Inc., Calgary (CA)

( * ) Notice: Subject to any disclaimer, the term of this patent is extended or adjusted under 35 U.S.C. 154(b) by 9 days.

(21) Appl. No.: 17/683,678

(22) Filed: Mar. 1, 2022

(65) Prior Publication Data
US 2022/0282594 A1 Sep. 8, 2022

Related U.S. Application Data (60) Provisional application No. 63/156,297, filed on Mar. 3, 2021.

(51) Int. Cl.
*E21B 36/00* (2006.01)
*E21B 17/02* (2006.01)
*E21B 43/12* (2006.01)
*H01R 13/52* (2006.01)

(52) U.S. Cl.
CPC .......... *E21B 36/001* (2013.01); *E21B 17/028* (2013.01); *E21B 43/128* (2013.01); *H01R 13/5202* (2013.01)

(58) Field of Classification Search
CPC .... E21B 17/028; E21B 36/001; E21B 43/128; H01R 13/5202
See application file for complete search history.

(56) References Cited

U.S. PATENT DOCUMENTS

| 1,948,964 | A | * | 2/1934 | Gay ..................... | H01B 7/29 |
| | | | | | 174/12 R |
| 5,289,882 | A | * | 3/1994 | Moore .................. | H01R 13/5205 |
| | | | | | 439/204 |
| 2008/0202042 | A1 | * | 8/2008 | Mesrobian ............ | B66D 1/14 |
| | | | | | 52/120 |

* cited by examiner

*Primary Examiner* — D. Andrews
(74) *Attorney, Agent, or Firm* — GORDON & JACOBSON, P.C.

(57) ABSTRACT

A system for use in hydrocarbon production includes a well that has a wellhead and extends downhole into a reservoir. The wellhead has a passageway that extends through a sidewall thereof. The system includes piping extending from the wellhead at the passageway. A downhole electrical device is disposed downhole in the well. A cable is coupled to the downhole electrical device and includes electrical wires extending from the downhole electrical device, out of the wellhead, through the passageway in the sidewall, and along the piping. A cooling section is disposed along the piping through which the electrical wires pass, and an electrical connector is coupled to the electrical wires for electrical connection thereto such that the wires extend along the cooling section between electrical connector and the wellhead.

14 Claims, 7 Drawing Sheets

SYSTEM AND PROCESS FOR INSTALLING A HYDROCARBON PRODUCTION SYSTEM

TECHNICAL FIELD

The present invention relates to a system for hydrocarbon production including a downhole electrical device and a process for installing the system.

BACKGROUND

Extensive deposits of viscous hydrocarbons exist around the world, including large deposits in the Northern Alberta oil sands that are not susceptible to standard oil well production technologies. One problem associated with producing hydrocarbons from such deposits is that the hydrocarbons are too viscous to flow at commercially relevant rates at the temperatures and pressures present in the reservoir. In some cases, such deposits are mined using open-pit mining techniques to extract hydrocarbon-bearing material for later processing to extract the hydrocarbons. Alternatively, thermal techniques may be used to heat the reservoir to mobilize the hydrocarbons and produce the heated, mobilized hydrocarbons from wells.

One thermal method of recovering viscous hydrocarbons in the form of bitumen, also referred to as oil sands, is known as steam-assisted gravity drainage (SAGD). In the SAGD process, pressurized steam is delivered through an upper, horizontal, injection well, also referred to as an injector, into a viscous hydrocarbon reservoir while hydrocarbons are produced from a lower, generally parallel, horizontal production well, also referred to as a producer, that is near the injection well and is vertically spaced from the injection well. The injection and production wells are generally situated in the lower portion of the reservoir, with the producer located close to the base of the hydrocarbon reservoir to collect the hydrocarbons that flow toward the base of the reservoir.

The injected steam during SAGD initially mobilizes the hydrocarbons to create a steam chamber in the reservoir around and above the horizontal injection well. The term steam chamber in the context of a SAGD operation is utilized to refer to the volume of the reservoir that is heated to the steam saturation temperature with injected steam, and from which mobilized oil has at least partially drained and been replaced with steam vapor. As the steam chamber expands, viscous hydrocarbons in the reservoir and water originally present in the reservoir are heated and mobilized and move with aqueous condensate, under the effect of gravity, toward the bottom of the steam chamber. The hydrocarbons, the water originally present, and the aqueous condensate are typically referred to collectively as emulsion. The emulsion accumulates and is collected and produced from the production well. The produced emulsion is separated into dry oil for sales and produced water.

When fluids do not naturally flow to the surface or do not naturally flow at a sufficient rate, a pump or gas lift techniques may be utilized, referred to as artificial lift. Artificial lift is utilized to increase flow rates such that commercial hydrocarbon volumes are boosted or displaced to the surface. Artificial lift also improves recovery by reducing the downhole pressure at which wells become uneconomic and are abandoned. In addition, development of unconventional resources such as viscous hydrocarbons usually includes construction of complex wells, and high hydrocarbon lifting rates are desirable to produce oil quickly and efficiently at low cost.

Artificial lift may be utilized along with the SAGD process to increase the flow rate from the production well. Electric submersible pumps may be utilized in the production well to facilitate the flow of the fluids to the surface. When utilized, electric submersible pumps are typically located in or near a horizontal segment of the production well, into which fluid flows during the SAGD process, at depths of hundreds of meters. Electrical cable extending from a wellhead to the electric submersible pump is utilized to power the electric submersible pump.

The electrical cables for such electric submersible pumps are exposed to a wide range of conditions. For example, the cables may be exposed to cold weather such as temperatures of about −40° C. prior to insertion into a production well. The same cable extends downhole to reservoir temperatures near 250° C. (482° F.). High-temperature motors and cables are utilized.

Failure rates in electric submersible pumps related to electrical shorting are high and are primarily attributable to failure of the electrical cable system, which often occurs at a connection point.

Other electrical equipment and combinations of electrical equipment may also be utilized downhole in the hydrocarbon recovery process. For example, a downhole heater may be utilized in the injection or in the production well during start-up operations or during production to increase uniformity of expansion of the steam chamber, which typically does not expand uniformly over the length of the well pair. Such a heater may be disposed in an electric heater string and is coupled to an armor-protected electrical cable that extends to the surface.

As with electric submersible pumps, electrical cables utilized for downhole heaters are also susceptible to damage and failure.

Reduction in failure rates in downhole electrical equipment as a result of failure of the electrical cable connections is desirable.

SUMMARY

According to an aspect of an embodiment, there is provided a system for use in hydrocarbon production from a hydrocarbon reservoir. The system includes a well including a wellhead at a surface. The well extends downhole into a reservoir and the wellhead has a passageway that extends through a sidewall thereof. The system also includes piping extending from the wellhead at the passageway. A cable is coupled to a downhole electrical device and includes electrical wires extending from the downhole electrical device, out of the wellhead, through the passageway in the sidewall, and along the piping. A cooling section is disposed along the piping through which the electrical wires pass, and an electrical connector is coupled to the electrical wires for electrical connection thereto such that the wires extend along the cooling section between electrical connector and the wellhead.

According to another aspect of an embodiment, there is provided a process for installing a hydrocarbon production system in a hydrocarbon recovery well having a wellhead. The process includes feeding, through a top of the wellhead, an electric submersible pump and cable including electrical wires coupled to the electric submersible pump, downhole, cutting an uphole end of the cable after feeding the electric submersible pump downhole, routing the uphole end of the electrical wires through a passageway that extends through a sidewall of the wellhead, feeding the electrical wires through piping extending from the side of the wellhead at the passageway while the pump is located downhole, through a cooling section along the piping such that the electrical wires extend out the side of the wellhead, through the piping and through the cooling section, and electrically coupling the electrical wires to a connector after feeding the electrical wires through the cooling section, to power the electric submersible pump.

BRIEF DESCRIPTION OF THE DRAWINGS

Embodiments of the present invention will be described, by way of example, with reference to the drawings and to the following description, in which.

DETAILED DESCRIPTION

The disclosure generally relates to a system for use in recovery of hydrocarbons from a hydrocarbon reservoir that includes a well with a wellhead at a surface. The well extends downhole into a reservoir and the wellhead has a passageway that extends through a sidewall thereof. The system includes piping extending from the wellhead at the passageway. A cable is coupled to a downhole electrical device and includes electrical wires extending from the downhole electrical device, out of the wellhead, through the passageway in the sidewall, and along the piping. A cooling section is disposed along the piping through which the electrical wires pass, and an electrical connector is coupled to the electrical wires for electrical connection thereto such that the wires extend along the cooling section between the electrical connector and the wellhead.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Reference is made herein to an injection well and a production well. The injection well and the production well may be physically separate wells. Alternatively, the production well and the injection well may be housed, at least partially, in a single physical wellbore, for example, a multilateral well. The production well and the injection well may be functionally independent components that are hydraulically isolated from each other, and housed within a single physical wellbore.

The description below refers generally to SAGD. The system and process described herein is not limited to SAGD, however, as the system and the process may be utilized in other operations such as a solvent assisted process (SAP) or other process.

Figure 1:
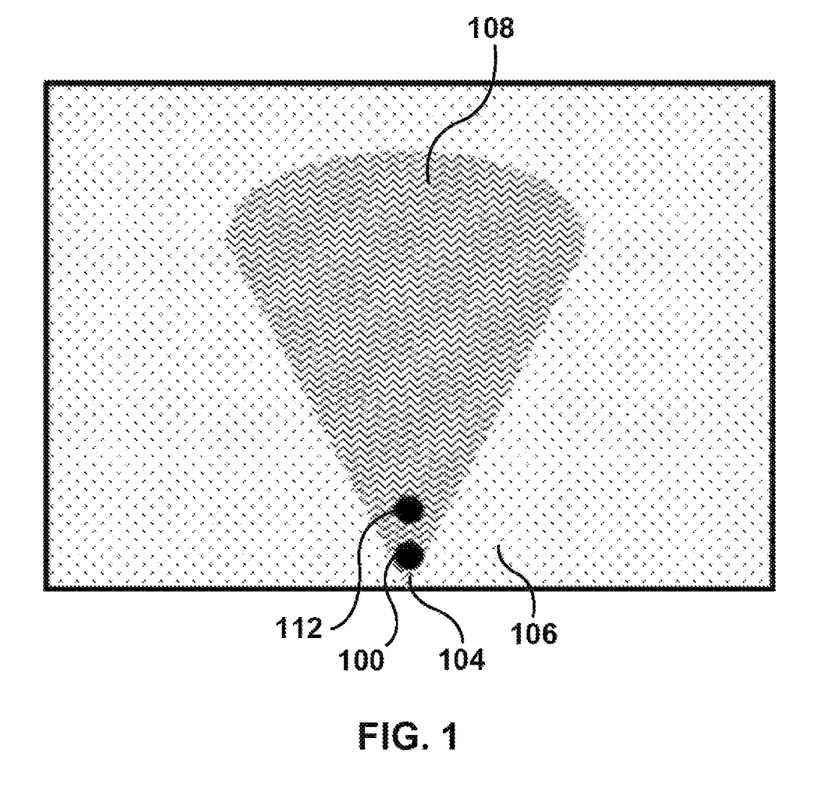
FIG. 1 is a schematic sectional view through a reservoir, illustrating a relative location of an injection well and a production well.
Figure 2:
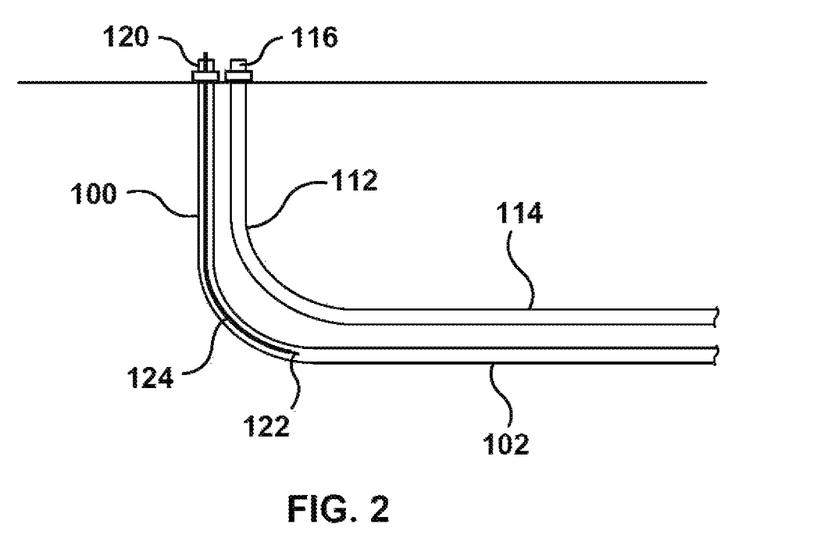
FIG. 2 is a sectional side view illustrating a SAGD well pair including an injection well and a production well.

As described above, a steam-assisted gravity drainage (SAGD) process may be utilized for mobilizing viscous hydrocarbons. In the SAGD process, a well pair, including a hydrocarbon production well and a steam injection well are utilized. An example of a well pair is illustrated in FIG. 1 and FIG. 2. The hydrocarbon production well 100 includes a generally horizontal portion 102 that extends near the base or bottom 104 of the hydrocarbon reservoir 106. An injection well 112 also includes a generally horizontal portion 114 that is disposed generally parallel to and is spaced vertically above the horizontal portion 102 of the hydrocarbon production well 100.

During production utilizing SAGD, steam is injected into the injection wellhead 116 and through the steam injection well 112 to mobilize the hydrocarbons and create a steam chamber 108 in the reservoir 106, around and above the generally horizontal portion 114.

Viscous hydrocarbons in the reservoir 106 are heated and mobilized and the mobilized hydrocarbons drain under the effects of gravity. Fluids, including the mobilized hydrocarbons along with condensate, are collected in the generally horizontal portion 102 and are recovered via the hydrocarbon production well 100 and through the production wellhead 120. Production may be carried out for any suitable period of time.

As indicated above, artificial lift may be utilized when fluids do not naturally flow to the surface at a sufficient rate. Artificial lift increases the flow rate to improve the recovery rate to economically viable rates. In addition, artificial lift may be utilized to recover hydrocarbons from unconventional resources.

An electric submersible pump 122 may be utilized in the production well 100 to facilitate the flow of the fluids to the surface. When utilized, the electric submersible pump 122 is located in or near a horizontal segment of the production well 100, into which fluid flows during the SAGD process, at depths of hundreds of meters below surface. The electric submersible pump 120 is coupled to a production conduit 124 and to an electrical cable extending from a wellhead to the electric submersible pump 122 to power the electric submersible pump 122.

A connector that is disposed in the wellhead is utilized to connect the cables to an electrical source outside the wellhead. The connector, however, is located in the wellhead and is exposed to heat in the wellhead as the well extends downhole into the reservoir. Thus, the connector may be exposed to very high temperatures that are associated with a thermal process such as SAGD. For example, the connector may be exposed to a temperature at or near 250° C. (482° F.). High-temperature motors and cables are utilized in thermal operations. The lifespan of the connectors, however, is typically very limited as a result of the exposure to the heat. The present disclosure provides a system for use in production from a hydrocarbon reservoir in which a connector is disposed at a location at which the electrical wires are cooler than the temperature in the wellhead, and at a lower pressure. Thus, the connection point is at a location at which the temperature and pressure are lower than that within the wellhead.

Figure 3:
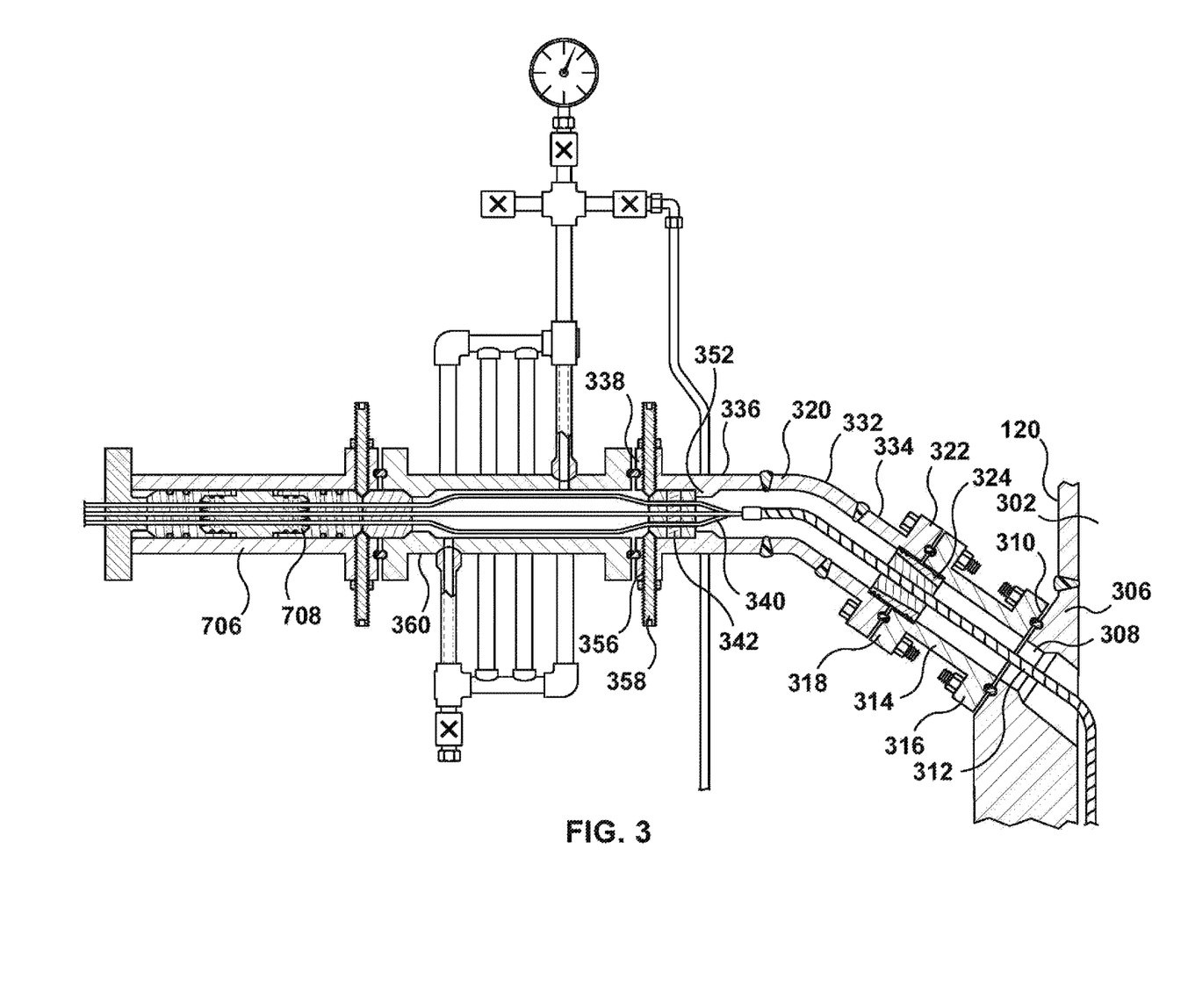
FIG. 3 is a sectional side view of a system for use in hydrocarbon production from a hydrocarbon reservoir, in accordance with an aspect of an embodiment.

Referring to FIG. 3, a system for use in production from a hydrocarbon reservoir in accordance with one example of an embodiment, is illustrated. A part of a production wellhead 120 is shown. The production wellhead 120 includes the borehole 302 that extends generally vertically, and the tubing string. The production wellhead 120 has a shoulder 306 that includes a passageway 308 extending through the shoulder from the borehole 302 to an outer connection surface 310. The diameter of the passageway 308 is greater adjacent to the borehole 302 than the diameter of the passageway 308 at the outer connection surface 310. The change in diameter may be gradual or may be stepped. The passageway 308 extends from the vertical production wellhead 120 at an angle thereto such that the passageway extends at least partially laterally away from the wellhead. The shoulder 306 and the passageway 308 facilitate the connection of pipe spools to the wellhead 120. An electrical cable 312 through which electricity is provided to the downhole equipment therefore passes out of the wellhead, through the passageway and through the pipe spools. The pipe spools coupled to the shoulder provide a cooling section and seals that are laterally displaced from the wellhead 120 where temperatures and pressures may be very high. Thus, unlike systems in which the electrical cable and connector are disposed within the wellhead and extend generally vertically through the wellhead, the electrical cable 312 and wires within the electrical cable 312 extend out the side of the wellhead, through the passageway 308, and along the pipe spools which include the cooling section and the seals. As a result, the connector that is coupled to the wires of the electrical cable 312 is displaced from the temperatures and pressures within the wellhead 120.

A centerline of the passageway 308 may be at an acute angle from the vertical and the passageway may extend at about the same height in the wellhead 120 as a port through which a DTS coil extends, but about a 90 degree rotation around the wellhead 120 from the DTS coil port. For example, the passageway 308 may extend at an angle of about 55 degrees from the vertical. The passageway angle of, for example, 55 degrees from the vertical, and the greater diameter of the passageway 308 adjacent to the borehole, together reduce the chance that the electrical cable 312 that extends from downhole, up through a lower part of the wellhead 120 and out the passageway 308, is bent beyond an acceptable bend radius that may lead to premature failure.

A first pipe spool 314 is coupled to the shoulder 306, at the outer connection surface 310, with an inner flange 316 of the first pipe spool 314 bolted to the shoulder 306, and provides an extension of the inner passageway, away from the production wellhead 120.

An outer flange 318 of the first pipe spool 314 connects to an inner flange 322 of a second pipe spool 320. The outer flange 318 of the first pipe spool 318 and the inner flange 322 of the second pipe spool 320 together provide a cavity 324. Part of the cavity 324 extends into the outer flange 318 of the first pipe spool 318 and part of the cavity 324 extends into the inner flange 322 of the second pipe spool 320.

Figure 4:
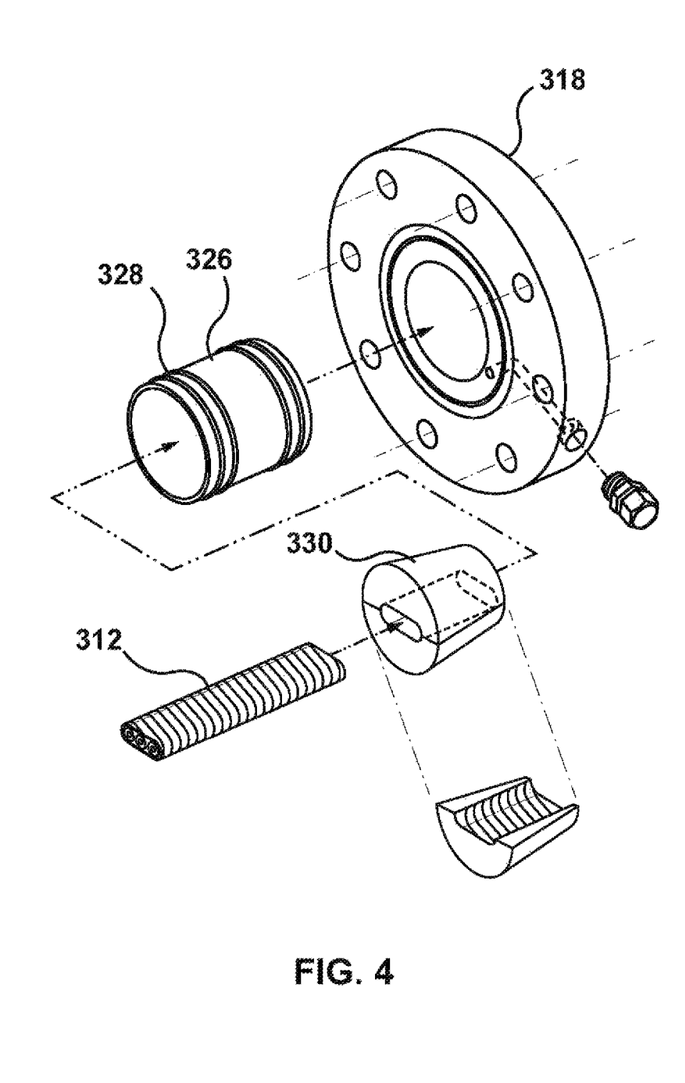
FIG. 4 is an exploded view of parts of the system of FIG. 3.

Referring to FIG. 4 in addition to FIG. 3, an internally tapered sleeve 326 is sized to fit into the cavity 324 and to be trapped in the cavity 324. The internally tapered sleeve 326 has a diameter that tapers from a larger diameter end in the second pipe spool 320 to a smaller diameter end in the first pipe spool 314. The internally tapered sleeve 326 is sealed in the cavity 324, for example, by a pair of O-rings 328 that extend around the internally tapered sleeve 326, with one of the O-rings 328 sealing with the inner surface of the cavity 324 at the inner flange 322 of the second pipe spool 320 and the other of the O-rings 328 sealing with the inner surface of the cavity at the outer flange 318 of the first pipe spool 314.

A tapered clamp 330 extends around the armor of the electrical cable 312. The tapered clamp 330 may be a split socket clamp that extends around the electrical cable 312. Optionally, the tapered clamp 330 may grasp the electrical cable 312 when the tapered clamp 330 is pushed into the internally tapered sleeve 326. Thus, the tapered clamp 330 is sized to receive the armored electrical cable 312 for the internally tapered sleeve 326 to exert a force thereon when pressed inside the internally tapered sleeve 326.

With the electrical cable 312 in the tapered clamp 330 located in the tapered sleeve 326, which is held in the outer flange 318 of the first pipe spool 314 and the inner flange 322 of the second pipe spool 320, the electrical cable 312 is grasped and supported in the wellhead, with sufficient slack in the electrical cable 312 to accommodate movement of the electrical cable 312 as a result of thermal changes. The electrical cable 312 is maintained in the tapered clamp.

Referring again to FIG. 3, the second pipe spool 320 extends to the outer flange 338. In the present example, the second pipe spool 320 includes an elbow 332 such that a first part 334 of the second pipe spool 320 extends in line with the first pipe spool 314 and a second part 336 of the second pipe spool 320 extends generally horizontally, or at 90 degrees to the wellhead 120.

The armor of the electrical cable 312 is stripped off part of the way along the second pipe spool 320 such that the three separate electrical wires 340 of the electrical cable 312 extend within the second part 336 of the second pipe spool 320, absent the outer armor of the electrical cable 312. The three electrical wires 340 are still protected as each wire still has its own insulation and sheathing. The metal armor on the cable may be taped or clamped to maintain the metal armor on the cable and inhibit unwinding of the metal armor.

Figure 5:
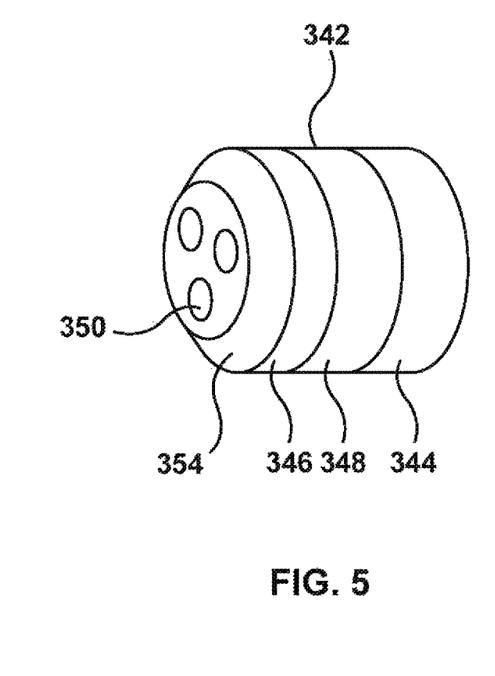
FIG. 5 is a perspective view of a part of the system of FIG. 3.

The interior diameter of the second pipe spool 320 is reduced in the second part 336 of the second pipe spool 320, at a location near the outer flange 338. The interior diameter is reduced, for example, by an internal ring that provides a step 352. The step 352 is utilized as a seat for a first seal 342. Referring to FIG. 5 in addition to FIG. 3, the first seal 342 includes a first metal plate 344 and a second metal plate 346 separated by an elastomer sealing element 348. The second metal plate 346 includes a tapered end 354. Each of the three electrical wires 340 extends through a respective one of the holes 350 that extend through the first metal plate 344, the second metal plate 346 and the sealing element 348. Thus, the first seal 342 is located in the second pipe spool 320 near an outer end thereof and is seated on the step 352 in the diameter of the second pipe spool 320.

Referring again to FIG. 3, the outer flange 338 of the second pipe spool 320 includes threaded holes 356 that extend from a generally cylindrical outer surface of the outer flange 338, into the interior of the second pipe spool 320. In the present example, the outer flange 338 includes four threaded holes 356. The threaded holes 356 each receive a respective lag bolt 358. A tapered end of each lag bolt 358 acts against the tapered end 354 of the second metal plate 346. Thus, with the lag bolts 358 inserted, the lag bolts engage and apply a force against second metal plate 346, pushing the second metal plate 346 toward the first metal plate 344. The first metal plate 344 is seated on the step 352, inhibiting movement of the first seal 342 or any part thereof further into the second pipe spool 320. Thus, the sealing element 348 is compressed between the first metal plate 344 and the second metal plate 346, creating a seal with the interior surface of the second pipe spool 320 and sealing around the electrical wires 340.

Figure 6:
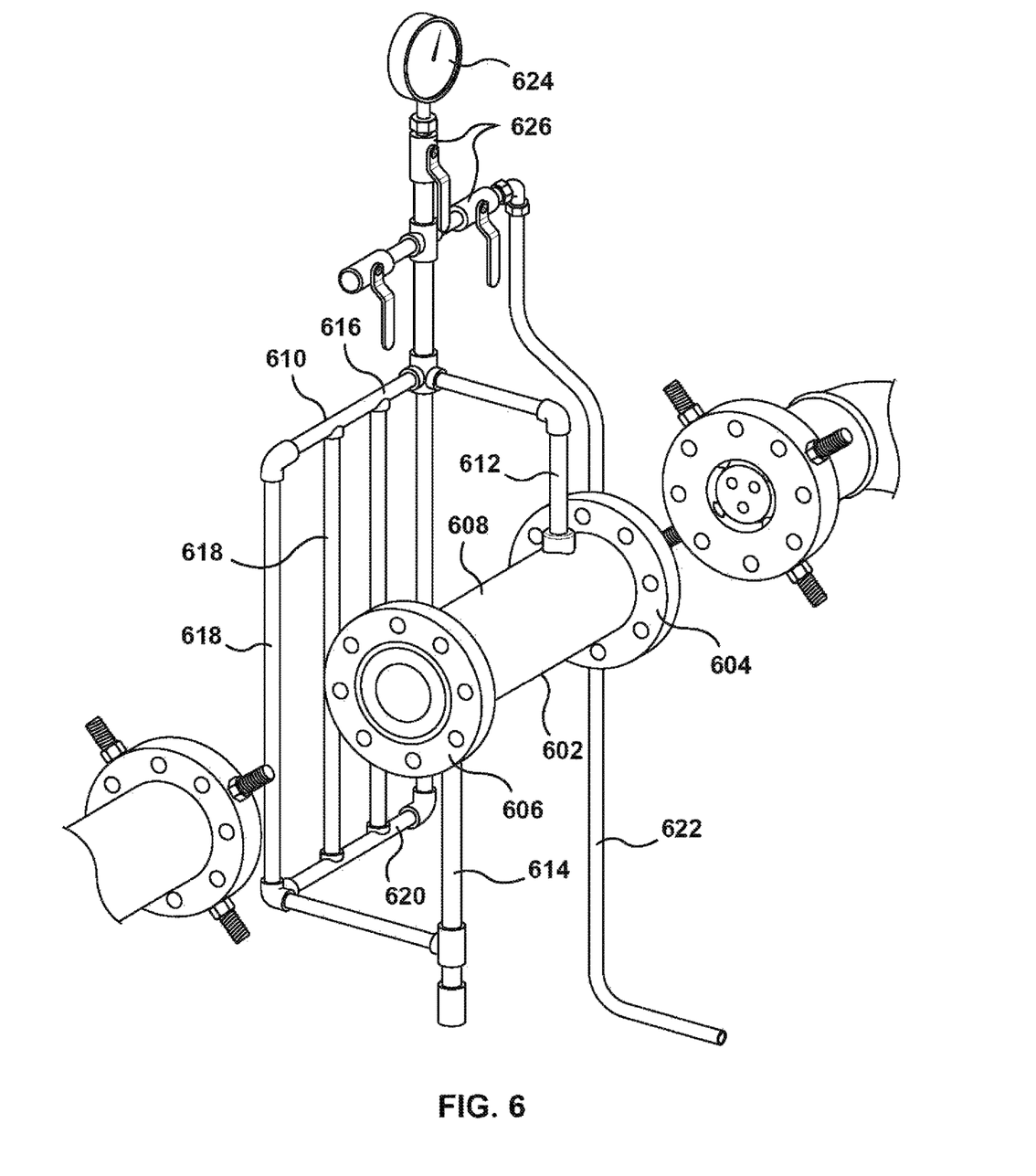
FIG. 6 is an exploded view showing parts of the system of FIG. 3.

The outer flange 318 of the second spool 318 is coupled to a cooling section 360 through which the electrical wires 340 pass. An exploded view of a part of the system including the cooling section 360 is shown in FIG. 6. As illustrated in FIG. 6, the cooling section includes a cooling pipe spool 602 that includes inner and outer flanges 604, 606 at the ends and a main pipe 608 extending between the flanges 604, 606.

A cooling radiator 610 includes an inlet pipe 612 coupled to the main pipe 608, at a top thereof, near the inner flange 604. The cooling radiator 610 also includes an outlet pipe 614 coupled to the main pipe 608, at a bottom thereof, near the outer flange 606. The inlet pipe 612 is fluidly coupled to a generally horizontally extending inlet manifold tube 616 that disperses the cooling media from the inlet pipe 612 to one of several generally vertically extending cooling tubes 618. The cooling tubes 618 are fluidly coupled to an outlet manifold tube 620 for receiving cooling media from the cooling tubes 618. The outlet manifold tube 620 is fluidly coupled to the outlet pipe 614 for returning the cooling media to the main pipe 608.

A pressure equalizing line 622 fluidly couples the wellbore to the cooling section 360, for example by coupling the cooling radiator 610 to the casing of the wellbore or to the wellhead 120. In the example shown in FIG. 6, the pressure equalizing line 622 is coupled to the cooling radiator 610 at or near the location at which the inlet pipe 612 is coupled to the inlet manifold tube 616. A pressure equalizing line may be coupled to the cooling section or the radiator at any other suitable location, however.

The cooling section 360 includes the cooling media, which may be, for example, a mineral oil or other suitable cooling fluid. The cooling media is sealed within the cooling section 360 of the piping by the first seal 342 and a second seal described below. The cooling section 360 may be a passive cooling section in which hot cooling media flows into the inlet pipe 612 and, as the hot cooling media cools and thus the density of the cooling media increases, the cooling media naturally flows from the inlet manifold tube 616, through the cooling tubes 618, through the outlet manifold tube 620, through the outlet pipe 614, and back into the main pipe 608.

In the example shown, the outlet manifold tube 620 is shown below the main pipe 608 and the cooling media rises in the outlet pipe 614 to return to the main pipe 608. The outlet manifold tube 620 may, however, be at or close to the same level as the main pipe 608 such that very little, if any, upward movement of the cooling media occurs for the cooling media to move from the outlet manifold tube 620 to the main pipe 608.

The pressure equalizing line 622 includes a pressure gauge 624 to monitor pressure and valves 626 to control the gas flow from the wellbore and to selectively isolate the cooling section 360 from the pressure equalizing line 622.

Figure 7:
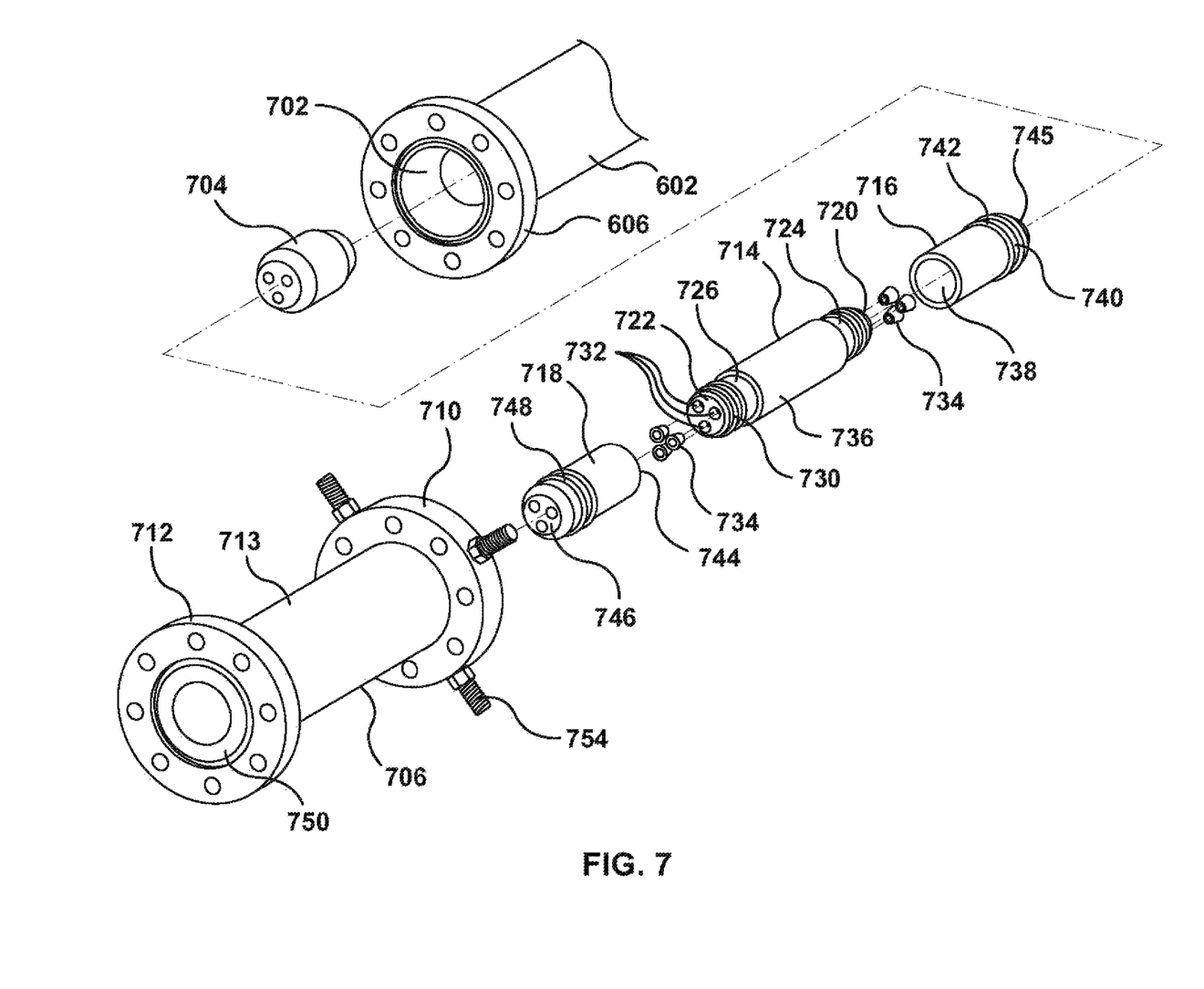
FIG. 7 is an exploded view showing further parts of the system of FIG. 3.

Referring now to FIG. 3 and to FIG. 7, a step 702 is located in the interior diameter of the cooling pipe spool 602, near the outer flange 606. The step 702 provides a seat for a stopper 704 that abuts against the step 702 and protrudes slightly from the cooling pipe spool 602, into a sealing pipe spool 706. The stopper 704 is utilized to facilitate positioning of a second seal 708 within the sealing pipe spool 706. The stopper 704 may be a metal cylinder with the electrical wires 340 extending through holes therein. The ends of the stopper 704 may be tapered.

The sealing pipe spool 706 includes an inner flange 710 and an outer flange 712 and a length of sealing pipe 713 extending between the inner flange 710 and outer flange 712.

The second seal 708 includes a cylindrical sealing member 714 and first and second end caps 716, 718. The cylindrical sealing member 714 includes three bore holes 732 extending lengthwise and through which the electrical wires 340 extend. The sealing member 714 is sized to fit within the sealing pipe 713. The diameter of the sealing member 714 is stepped down to provide a reduced diameter portion at each end 720, 722. The stepped down portion 724 adjacent the first end 720 of the sealing member 714 includes a pair of grooves therein on which O-rings 728 are seated to provide a seal between the sealing member 714 and the first end cap 716. Similarly, the stepped down portion 726 adjacent the second end 722 of the sealing member 714 includes a pair of grooves therein on which O-rings 730 are seated to provide a seal between the sealing member 714 and the second end cap 718.

The bore holes that extend lengthwise through the cylindrical sealing member 714 include tapered ends 732 in which tapered sealing elements 734 are located. The tapered sealing elements 734 may be any suitable material for sealing, such as an elastomeric material. The tapered sealing elements 734 form a seal around the electrical wires 340 that extend through the sealing pipe spool 706.

The first end cap 716 is a cylindrical cap that has an outer diameter that is similar to the outer diameter of the central portion 736 of the sealing member 714, between the two stepped down portions 724, 726. The first end cap 716 includes a large bore section 738 that is sized to fit over the first stepped down portion 724. The O-rings 728 form a seal between the first stepped down portion 724 and the large bore section 738 of the first end cap 716. The large borehole of the large bore section extends only partly into the first end cap 716, leaving an outer end section 740 of the first end cap 716 with three smaller holes extending through the outer end section 740, through which the electrical wires 340 pass. The outer end section 740 includes grooves in the outer surface in which outer O-rings 742 are seated. The outer O-rings 742 form a seal between the outer end section 740 and the interior surface of the sealing pipe 713. The outer end section 740 of the first end cap 716 includes a tapered end 745.

The second end cap 718 is similar to the first end cap 716. In particular, the second end cap 718 is a cylindrical cap with an outer diameter that is similar to the outer diameter of the central portion 736 of the sealing member 714, between the two stepped down portions 724, 726. The second end cap 718 also includes a large bore section 744 that is sized to fit over the second stepped down portion 726. The O-rings 730 form a seal between the second stepped down portion 726 and the large bore section 744 of the second end cap 718. The large borehole of the large bore section extends only partly into the second end cap 718, leaving an outer end section 746 of the second end cap 718 with three smaller holes extending through the outer end section 746, through which the electrical wires 340 pass. The outer end section 746 includes grooves in the outer surface in which outer O-rings 748 are seated. The outer O-rings 748 form a seal between the outer end section 746 and the interior surface of the sealing pipe 713.

The interior diameter of the sealing pipe spool 706 is reduced in the sealing pipe 713, adjacent or near the outer flange 712. The reduced interior diameter may be provided by an internal ring 750, for example. The internal ring 750 provides a seat against which the sealing member 714 abuts.

The inner flange 710 of the sealing pipe spool 706 includes threaded holes that extend generally radially, from a generally cylindrical outer surface of the inner flange 710, into the interior of the sealing pipe spool 706. In the present example, the inner flange 710 includes four threaded holes. The threaded holes each receive a respective lag bolt 754. A tapered end of each lag bolt 754 acts against the tapered end 745 of the first end cap 716. Thus, with the lag bolts 754 inserted, the lag bolts 754 engage and apply a force against the first end cap 716, toward the sealing member 714. The sealing member 714 in turn applies a force against the second end cap 718, which is constrained by the internal ring 750. The first end cap 716, the sealing member 714, and the second end cap 718 are thus forced together within the sealing pipe 713.

Thus, seals are formed in the sealing member 714, around the electrical wires. A seal is also formed between the sealing member 714 and each of the first end cap 716 and the second end cap 718. A seal is formed between the interior surface of the sealing pipe 713 and each of the first end cap 716 and the second end cap 718. Thus, the second seal 708 includes several seals that together provide a seal adjacent to the cooling pipe spool 602 and inhibiting the ingress of cooling fluid from the cooling pipe spool 602 into or past the sealing pipe spool 706.

The second seal 708 provides a seal adjacent the cooling section 360. Because the cooling section 360 is coupled to the pressure equalizing line 622, the pressure in the cooling section 360 is greater than the pressure in a portion of the piping on the opposite side of the second seal 708. Thus, the second seal 708 facilitates maintaining a pressure differential across the sealing pipe spool 706. Thus, the second seal 708 is located adjacent the cooling section 360 to provide a pressure seal at a lower temperature at which the seal may be maintained.

Figure 8:
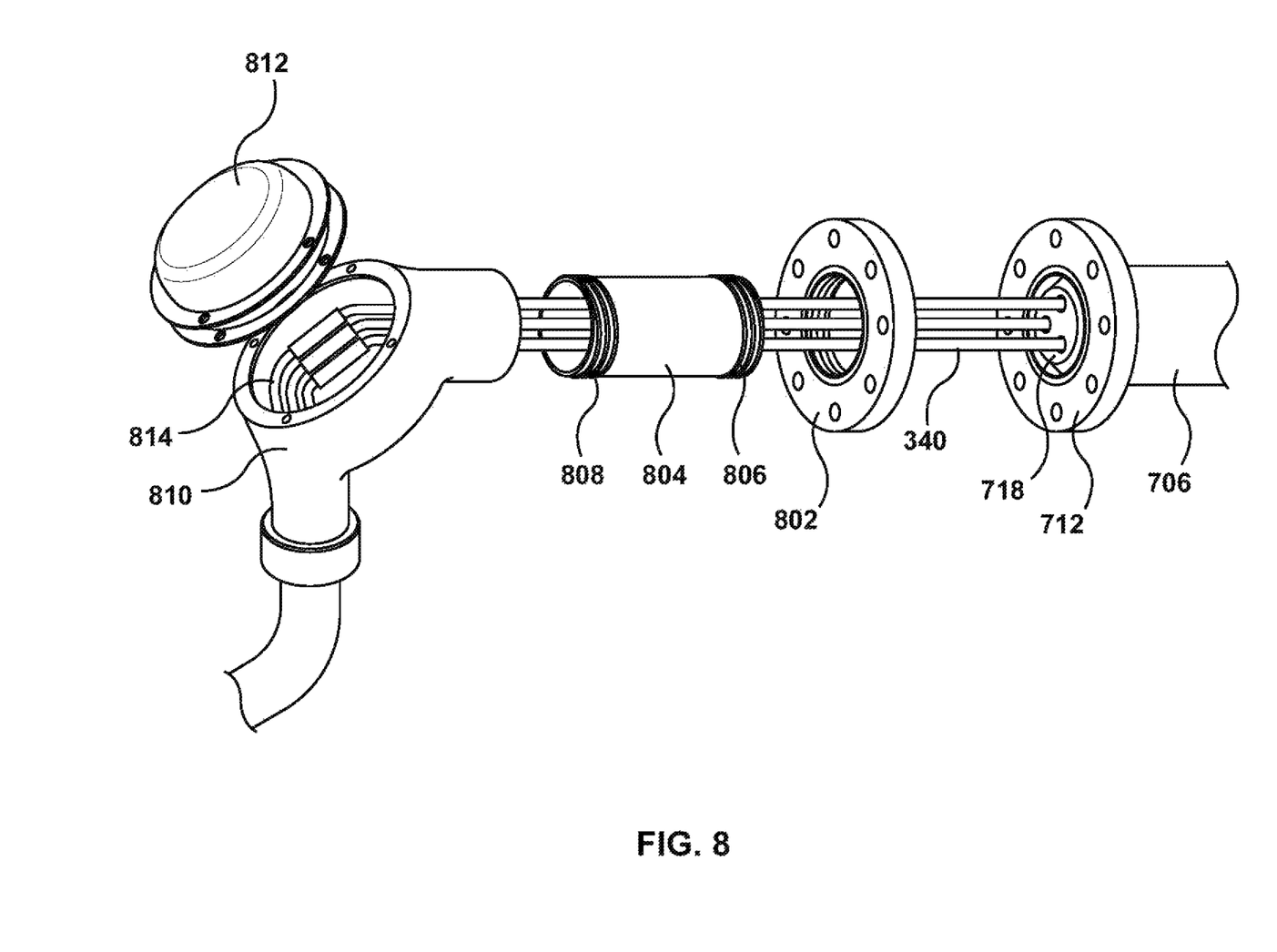
FIG. 8 is an exploded view showing still further parts of the system of FIG. 3.

The outer flange 712 of the sealing pipe spool 706 is coupled to a threaded flange 802 using, for example bolts through aligned bolt holes in the outer flange 712 and the threaded flange 802. The interior of the threaded flange 802 includes threads for coupling to a connector nipple 804 that is threaded at both ends 806, 808 for coupling to the threaded flange 802 at the first end 806 and to an electrical connector conduit 810 at the second end 808. The electrical connector conduit 810 is an enlarged elbow and includes a removable cap 812 coupled at an outer portion of the elbow to provide access to the electrical connections within the electrical connector conduit 810. The removable cap 812 includes a seal for sealing the electrical connection points within the electrical connector conduit 810.

The electrical wires 340 extend out of the second end cap 718, through the threaded flange 802 and the connector nipple 804 and into the electrical connector conduit 810. The electrical wires 340 are coupled, in the electrical connector conduit 810, to wires 814 extending from an electrical cable 816 to provide power to the downhole electrical equipment.

The electrical connector conduit 810 is an electrical connector or electrical connection point and is located outside the sealing pipe spool 706 to electrically connect the electrical wires 340 to the electrical cable 816. The cooling section 360 is therefore located between the electrical connector conduit 810 in which the electrical wires 340 are coupled to the electrical cable 816, and the wellhead 120 such that the electrical wires 340 and the connection points are removed from both the temperature and the pressure within the wellhead.

Figure 9:
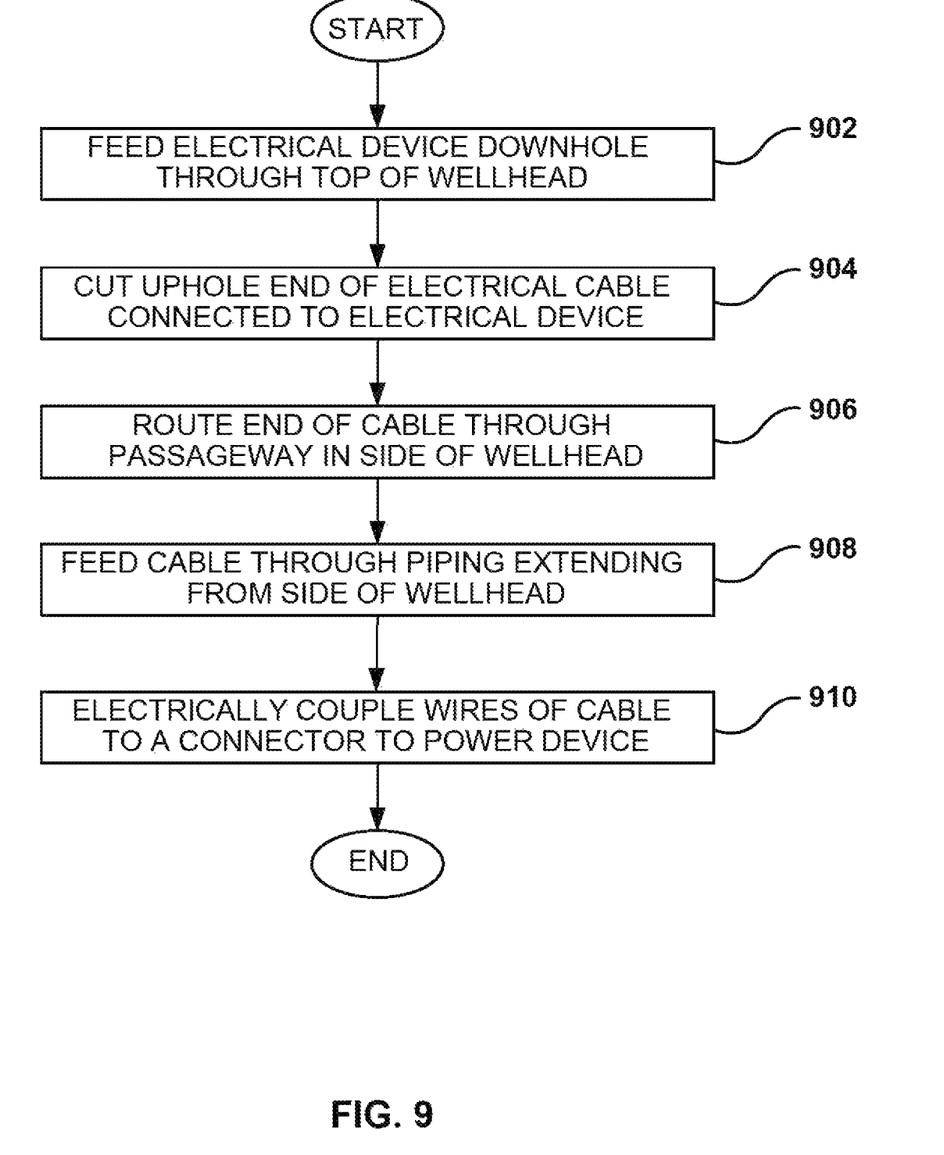
FIG. 9 is a flowchart illustrating a process for installing an electric submersible pump into a well of a hydrocarbon-bearing formation, in accordance with an aspect of an embodiment.

A flowchart illustrating a process for installing the system shown and described in FIG. 3 through FIG. 7 is shown in FIG. 9. The process may include additional or fewer elements than shown and described and parts of the process may be performed in a different order than shown or described herein.

The electric submersible pump and electrical cable 312, which includes the electrical wires 340, are fed downhole at 902 to a location that is farther along in the wellbore than the target location of the electric submersible pump. The electric submersible pump is fed downhole farther than the target location to provide additional cable sufficient to be retrieved and fed through the passage 308.

The uphole end of the electrical cable 312 is cut at 904. The electrical cable 312 is cut at a location that provides sufficient length for the electrical cable 312 and electrical wires 340 to be fed through the first pipe spool 314, the second pipe spool 320, the cooling pipe spool 602, the sealing pipe spool 706, and coupled to the connector 370 when the electric submersible pump is returned to the target position.

The uphole end of the electrical cable 312 is fed through the passageway 308 at 906. The electrical cable 312 is then fed, at 908, through the piping extending from the shoulder 306 by feeding the electrical cable 312 through the first pipe spool 314, and through the clamp 330 in the tapered sleeve 326. The metal armor around the electrical cable 312 is stripped off at a location along the electrical cable 312 such that the metal armour extends into the second pipe spool 314 and the separate electrical wires 340 extend into the first seal 342. The electrical wires 340 are fed into the first metal plate 344, the elastomeric sealing element 348, and the second metal plate 346. The first seal 342 is seated in the second pipe spool 320 on the step 352. The lag bolts 358 are inserted and screwed into place to apply force to the first seal 342 and create the seal.

The cooling section 360 is connected and the electrical wires 340 are fed through the cooling section. The electrical wires 340 are fed through the stopper 704 and the stopper is located on the step 702 in the cooling pipe spool 602.

The electrical wires 340 are then fed through the second seal 708 by feeding through the first end cap 716, the sealing member 714, and the second end cap 718. The electrical wires 340 and the second seal 708 are disposed in the sealing pipe spool 706 and the sealing pipe spool 706 is connected to the cooling pipe spool 602. The stopper 704 abuts the first end cap 716, keeping the second seal 708 in place, at a location at which the lag bolts 754 engage the first end cap 716 of the second seal 708. The lag bolts 754 are screwed into the threaded holes of the inner flange 710 to apply force to the second seal 708, and maintain the first end cap 716, the sealing member 714, and the second end cap 718 together in a sealing position.

The electrical wires 340 are fed through the threaded flange 802 and the connector nipple 804 and into the electrical connector conduit 810. The electrical wires 340 are coupled, in the electrical connector conduit 810, to wires 814 extending from an electrical cable 816 to provide power to the downhole electrical equipment at 910.

The cooling section 360 and the cooling radiator 610 are filled with the cooling media.

Advantageously, the connector is removed from both the temperature and the pressure within the wellhead as the cooling section is located between the connector that is coupled to the electrical wires and the wellhead. The angle of the passageway in the shoulder of the wellhead as well as the increase in diameter of the passageway toward the borehole, reduce the chance that the electrical cable is bent beyond an appropriate bend radius for the cable.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. A system for use in hydrocarbon production from a hydrocarbon reservoir, the system comprising:
   a well including a wellhead at a surface, the well extending downhole into a reservoir and the wellhead including a passageway extending through a sidewall thereof;
   piping extending from the wellhead at the passageway;
   a cable coupled to a downhole electrical device for use in hydrocarbon production, the cable including electrical wires extending from the downhole electrical device, out of the wellhead, through the passageway in the sidewall, and along the piping;
   a cooling section along the piping through which the electrical wires pass, a first seal along the piping and through which the electrical wires pass to seal around the electrical wires and seal with an interior surface of the piping, a second seal spaced from the first seal along the piping such that the first seal is disposed between the passageway and the second seal, wherein the cooling section is disposed between the first seal and the second seal, wherein the cooling section includes a cooling media disposed in the piping between the first seal and the second seal;
   a radiator comprising a plurality of pipes in fluid communication with the cooling section disposed between the first seal and the second seal and configured to receive the cooling media and return cooled cooling media to the cooling section, a pressure equalizing line associated with the cooling section for equalizing a pressure in the cooling section to a pressure on a wellhead side of the first seal; and
   an electrical connector coupled to the electrical wires for electrical connection thereto such that the wires extend along the cooling section between the electrical connector and the wellhead.

2. The system according to claim 1, wherein the cooling media comprises a mineral oil.

3. The system according to claim 1, wherein the cooling section and radiator are configured to passively cool the cooling media.

4. The system according to claim 1, further comprising a pressure equalizing line coupled to the radiator for equalizing a pressure in the cooling section to a pressure on a wellhead side of the first seal.

5. The system according to claim 1, wherein a pressure in the cooling section differs from a pressure in the piping on an opposing side of the second seal.

6. The system according to claim 1, wherein the piping is coupled to the wellhead to form an acute angle between a portion of the piping and the wellhead.

7. The system according to claim 1, wherein the piping is coupled to the wellhead at a shoulder thereof and the passageway extends through the shoulder.

8. The system according to claim 7, wherein an internal diameter of the passageway is greater at a first location at which the passageway meets the wellhead borehole than a second location at which the passageway meets the piping.

9. The system according to claim 1, wherein the downhole electrical device comprises an electric submersible pump.

10. A process of installing a hydrocarbon production system in a hydrocarbon recovery well having a wellhead, the process comprising:
    feeding, through a top of the wellhead, an electric submersible pump and cable including electrical wires coupled to the electric submersible pump, downhole;
    cutting an uphole end of the cable after feeding the electric submersible pump downhole;
    routing the uphole end of the electrical wires through a passageway that extends through a sidewall of the wellhead;
    feeding the electrical wires through piping extending from the side of the wellhead at the passageway while the pump is located downhole, through a cooling section along the piping such that the electrical wires extend out the side of the wellhead, through the piping and through the cooling section;
    sealing the electrical wires along the piping extending from the side of the wellhead utilizing a first seal to seal around the electrical wires and seal with an interior surface of the piping, sealing the electrical wires along the piping utilizing a second seal spaced from the first seal such that the first seal is disposed between the passageway and the second seal, and coupling a pressure equalizing line to the cooling section for equalizing pressure in the cooling section with a pressure on a wellhead side of the first seal; and
    electrically coupling the electrical wires to a connector after feeding the electrical wires through the cooling section, to power the electric submersible pump.

11. The process according to claim 10, wherein feeding, through the top of the wellhead, the electric submersible pump comprises feeding the pump to a location downhole of a target position of the electric submersible pump, and wherein routing the uphole end of the electrical wires through the passageway comprises returning the electric submersible pump to the target position after routing the uphole end of the electrical wires through the passageway.

12. The process according to claim 10, comprising filling the piping between the first seal and the second seal with a cooling media to provide a cooling section along the piping.

13. The process according to claim 10, comprising coupling the piping between the first seal and the second seal to a radiator to passively cool cooling media between the first seal and the second seal.

14. The process according to claim 10, wherein the pressure equalizing line is coupled to a casing of the well.

* * * * *